United States Patent [19]

Fueki

[11] Patent Number: 5,465,350
[45] Date of Patent: Nov. 7, 1995

[54] DATA TO ACCESS FILES IN AN OPTICAL DISK ARE COPIED TO A HARD DRIVE WHERE THE DATA ARE MAINTAINED EVEN UPON REMOVAL OF THE DISK

[75] Inventor: Kazumasa Fueki, Urawa, Japan

[73] Assignee: Ricoh Company, Ltd., Tokyo, Japan

[21] Appl. No.: 797,212

[22] Filed: Nov. 25, 1991

[30] Foreign Application Priority Data

Nov. 30, 1990 [JP] Japan ................................. 2-340208

[51] Int. Cl.$^6$ .................................................. G06F 17/30
[52] U.S. Cl. .................... 395/600; 395/497.01; 395/438; 369/34; 369/222.82; 369/243.4; 369/245.3; 369/246.8; 369/DIG. 1; 369/419.19
[58] Field of Search ................................. 395/600, 425, 395/725; 371/66; 364/222.82, 243.4, 238.4, 245.3, 246.8, 248.1, 249.6, 952.1, 952.31; 396/34

[56] References Cited

U.S. PATENT DOCUMENTS

| | | | |
|---|---|---|---|
| 4,934,823 | 6/1990 | Okami | 364/200 |
| 4,941,125 | 7/1990 | Boyne | 364/900 |
| 4,959,774 | 9/1990 | Davis | 364/200 |
| 4,974,197 | 11/1990 | Blount et al. | 364/900 |
| 5,025,431 | 6/1991 | Naito | 369/36 |
| 5,034,915 | 7/1991 | Styrna et al. | 364/900 |
| 5,115,499 | 5/1992 | Steffler et al. | 395/425 |
| 5,214,781 | 5/1993 | Miki et al. | 395/600 |
| 5,276,867 | 1/1994 | Kemley et al. | 395/600 |
| 5,321,831 | 6/1994 | Hirose | 395/600 |
| 5,325,523 | 6/1994 | Beglin et al. | 395/600 |

OTHER PUBLICATIONS

Korth, Henry F. et al., Data System Concept, 1986, pp. 371–375, McGraw–Hill Book Company New York.

Primary Examiner—Thomas G. Black
Assistant Examiner—Jack M. Choules
Attorney, Agent, or Firm—Popham, Haik, Schnobrich & Kaufman, Ltd.

[57] ABSTRACT

A data management method and apparatus used for a filing system in which management data is copied from an optical disk to a hard disk to manage image data stored in the optical disk. Hereupon, the optical disk has a storage capacity larger than that of the hard disk, but has an access time longer than that of the hard disk. Whenever new image data is recorded on the optical disk, new management data corresponding to the new image data is recorded on the hard disk, accordingly. The new image data is not copied from the hard disk to the optical disk until the management data on the hard disk satisfies a predetermined condition. That is, the new image data is not copied whenever the optical disk is ejected from an optical disk storage in the filing system. The new image data is to be recorded on the optical disk for many times. In addition, there occurs a case where it is necessary to use the optical disk for another filing system before all the image data is recorded thereon. Accordingly, the new image data is put together (accumulated) and then copied to the optical disk. Thus, the filing system can serve the average time for recording the new image data on the optical disk.

12 Claims, 5 Drawing Sheets

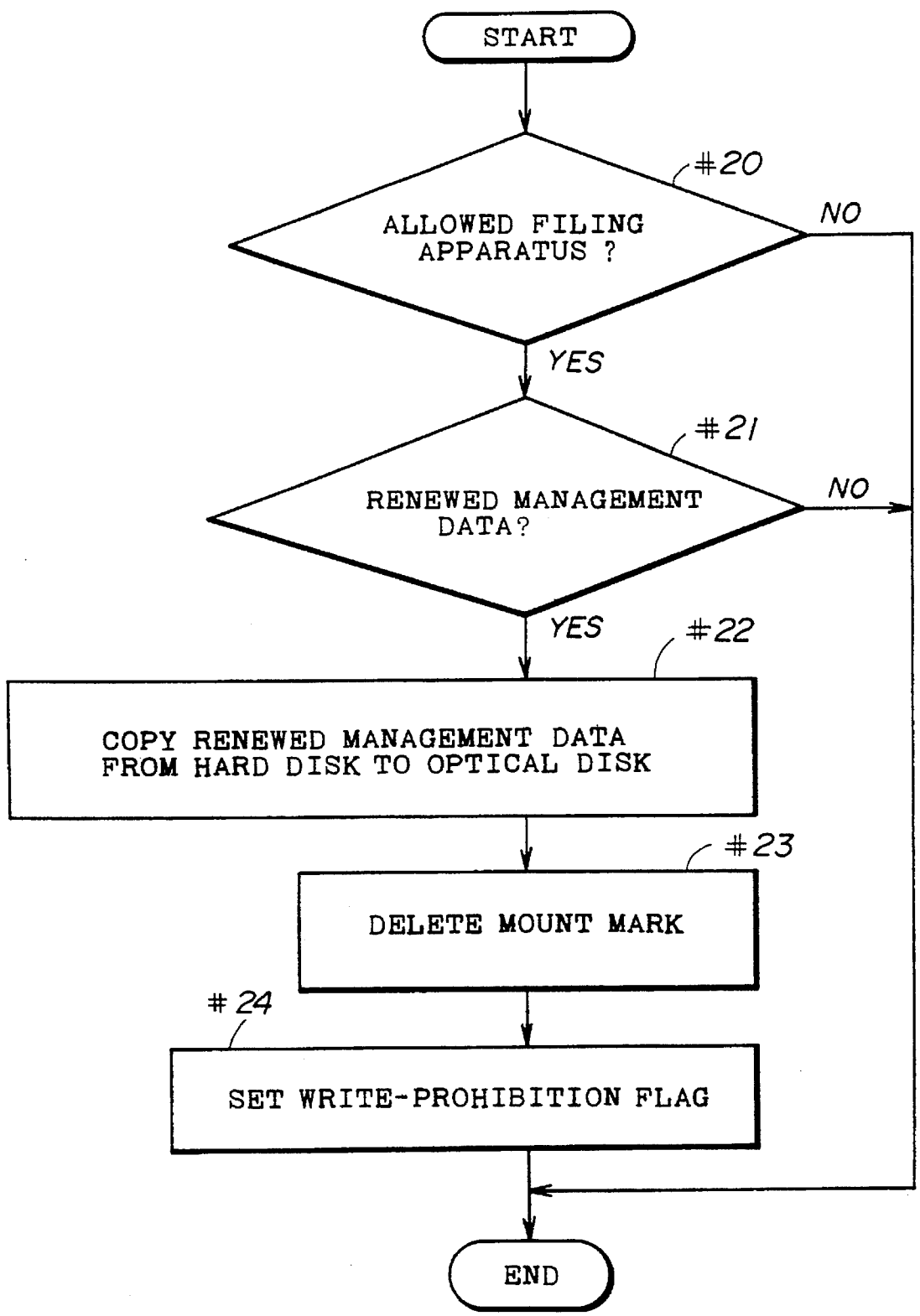

DATA TO ACCESS FILES IN AN OPTICAL DISK ARE COPIED TO A HARD DRIVE WHERE THE DATA ARE MAINTAINED EVEN UPON REMOVAL OF THE DISK

BACKGROUND OF THE INVENTION

The present invention relates generally to data management methods and apparatuses used for a filing system, and more particularly to a data management method and apparatus used for a filing system in which management data is copied from an optical disk to a hard disk to manage image data stored in the optical disk. Hereupon, the optical disk has a storage capacity larger than that of the hard disk, but has an access time longer than that of the hard disk.

A user of a conventional filing system in which a write-once optical disk stores at its different regions image data and management data for managing the image data first performs a mount process by which the management data is copied from the optical disk to a hard disk when the optical disk is loaded into an optical disk storage. Then the user accesses a desired image data via the management data stored in the hard disk to record new image data. At the same time the new management data corresponding to the new image data are recorded on the hard disk. Finally, the user performs a dismount process by which the new management data is copied from the hard disk to the optical disk before the optical disk is ejected from the optical disk storage.

However, the above conventional filing system has a disadvantage in that it takes a lot of time to perform the mount process and the dismount process whenever the optical disk is inserted into the optical disk storage and/or ejected therefrom. On the other hand, if the mount process and/or the dismount process are omitted, it also takes a lot of time to access the desired image data or the mobility of the optical disk is impossible. That is, even if an attempt is made to use an optical disk for a plurality of filing systems, it can be used only for the filing system in which it is first initialized to prevent the mismatch between the image data and the management data.

SUMMARY OF THE INVENTION

Accordingly, it is a general object of the present invention to provide a novel and useful data management method and apparatus used for a filing system filing image data in which the above disadvantage is eliminated.

Another and more specific object of the present invention is to provide a data management method and apparatus in which the numbers of mount processes and dismount processes are kept as low as possible while the mobility of the optical disk is possible.

According to one feature of the present invention, a data management method for managing main data and management data for managing the main data recorded on a first recording medium which is connectable to and disconnectable from a plurality of filing units which respectively have corresponding second recording media, the first recording medium having a storage capacity larger than that of each of the second recording media but having an access time longer than that of each of the second recording media, comprises the steps of copying the management data recorded on the first recording medium to one of the second recording media if the management data recorded on the first recording medium has not been copied to any of the second recording media, recording new main data on the first recording medium in an allowed filing unit by using the management data recorded on a second recording medium among the second recording media in the allowed filing unit, there being only one allowed filing unit among the plurality of filing units, recording new management data on the second recording medium of the allowed filing unit, the new management data being related to the new main data recorded on the first recording medium, and copying the new management data recorded on the second recording medium of the allowed filing unit to the first recording medium in the allowed filing unit if the renewed management data satisfies a predetermined condition, the first recording medium being able to be disconnected from the allowed filing unit if the renewed management data does not satisfy the predetermined condition.

According to another feature of the present invention, a filing unit using a first mode and a second mode comprises first recording/reproducing means, connectable to the first recording medium and disconnectable therefrom, for recording main data and management data for managing the main data on the first recording medium and/or for reproducing the main data and the management data therefrom, the first recording/reproducing means being able to record new main data on the first recording medium only if the filing unit uses the first mode, a second recording medium which has a storage capacity smaller than that of the first recording medium but has an access time shorter than that of the first recording medium, second recording/reproducing means, coupled to the second recording medium, for recording the management data on the second recording medium and/or for reproducing the management data therefrom, data managing means including mount processing means for copying the management data on the first recording medium to the second recording medium via the first and second recording/reproducing means, and backup processing means, coupled to the first and second recording/reproducing means, for copying new management data recorded on the second recording medium being related to the new main data to the first recording medium if the new management data satisfies a predetermined condition via the first and second recording/reproducing means.

According to the present invention, since the new management data is not copied to the first recording medium until it satisfies the predetermined condition, the first recording medium can be disconnected from the filing unit and be connected to another filing unit. Thus, the average time for recording the main data becomes relatively short.

Other objects and further features of the present invention will become apparent from the following detailed description when read in conjunction with the accompanying drawings.

BRIEF DESCRIPTION OF THE DRAWINGS

FIG.5 shows a flowchart executed by a dismount processing part 62 in the data manager 6 shown in FIG.1.

DETAILED DESCRIPTION OF THE PREFERRED EMBODIMENTS

Figure 1:
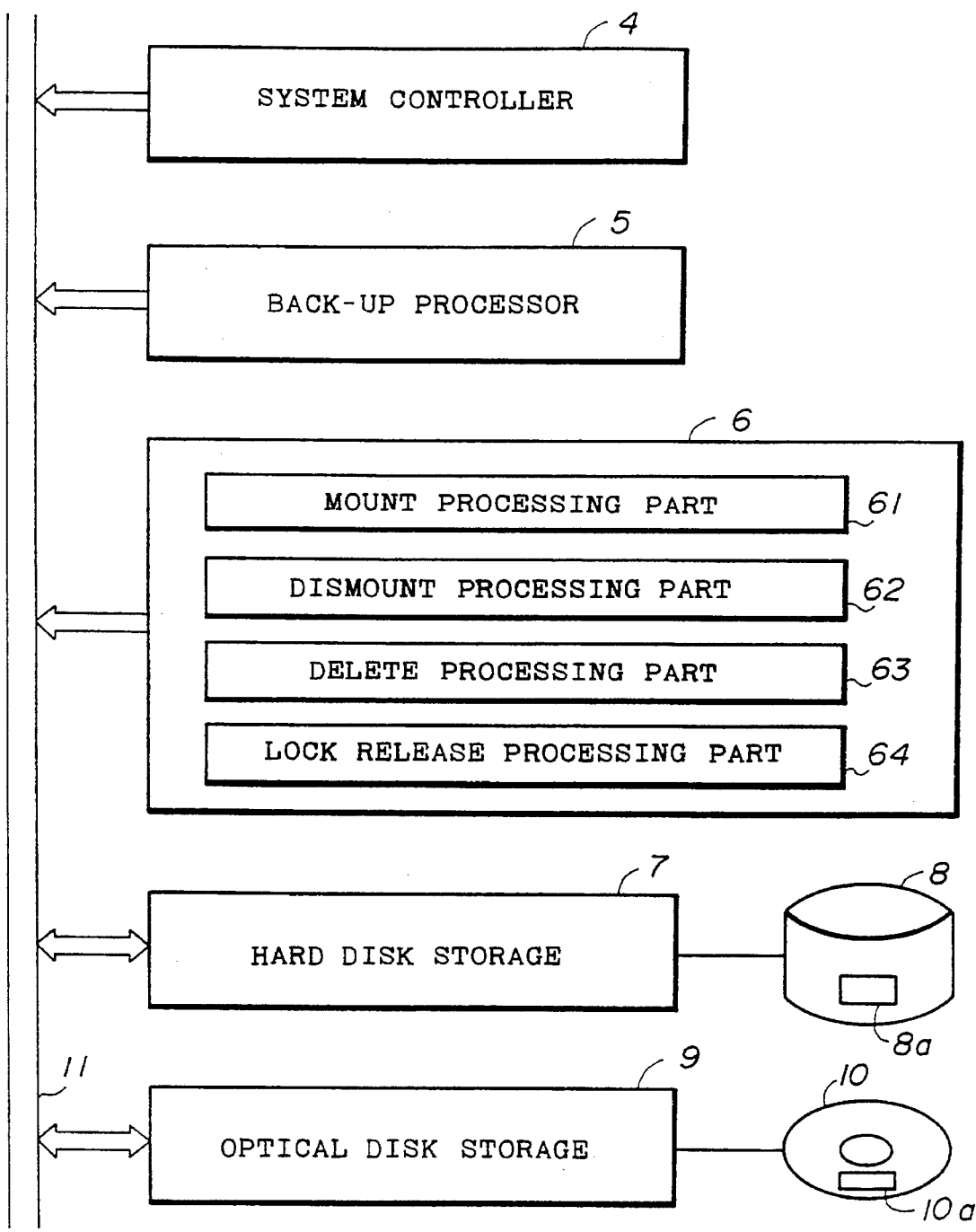
FIG.1 shows a block diagram of a filing system according to the present invention.
Figure 2:
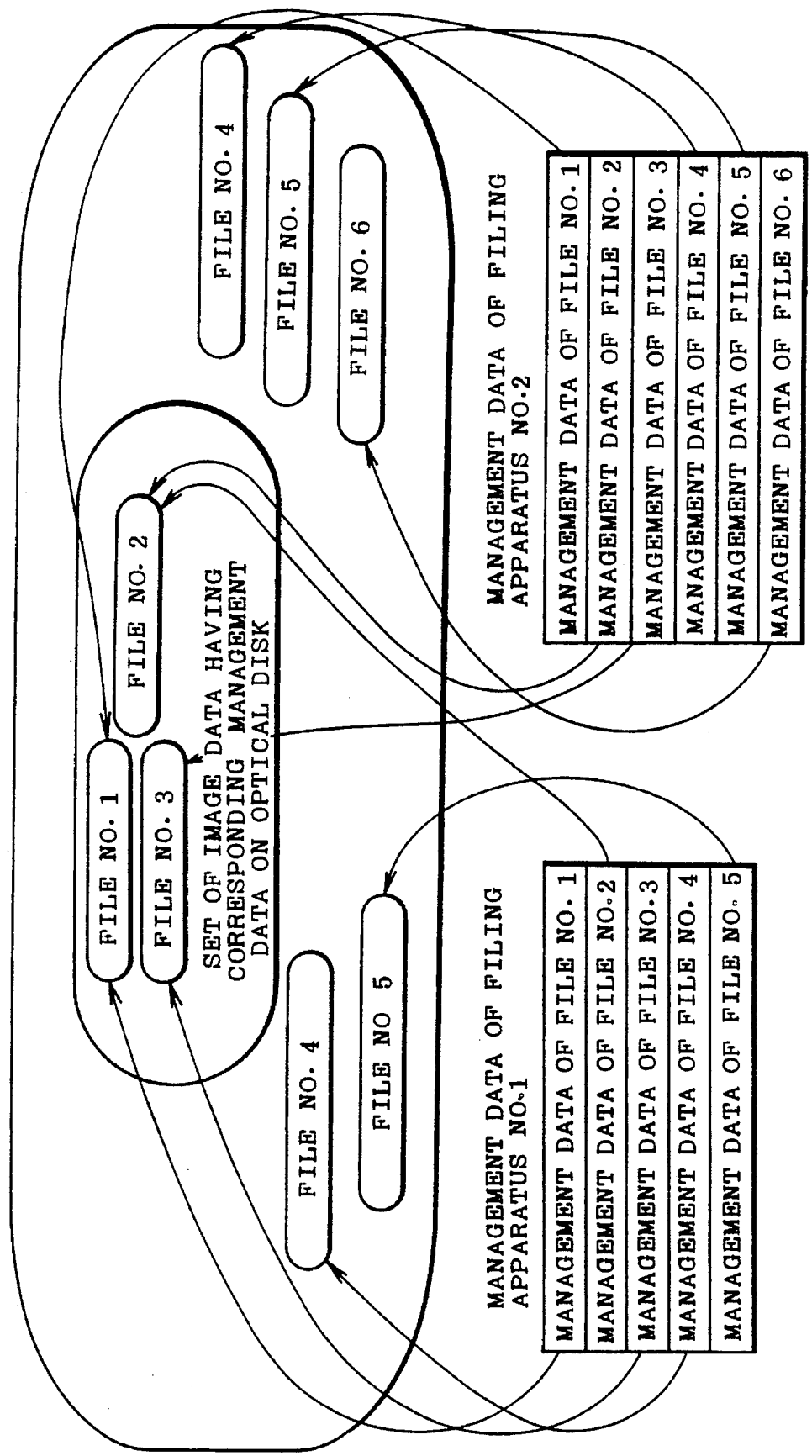
FIG.2 shows a circumstance to which an embodiment of the present invention is applied.

A filing unit according to the present invention comprises, as shown in FIG.1, a system controller 4, a backup processor 5, a data manager 6, a hard disk storage 7, a hard disk 8, an optical disk storage 9, an optical disk 10 and a system bus 11. The system controller 4, backup processor 5, data manager 6, hard disk storage 7 and optical disk storage 8 are respectively coupled with each other via the system bus 11. Incidentally, the filing unit further includes a host computer, connected to the system bus 11, by which a user of the filing system input new image data to the optical disk 10 via the optical disk storage 9 and new management data on the hard disk 8 via the hard disk storage 7. In this embodiment, the present invention is applied to a case where one optical disk is used for a plurality of filing units. In FIG.2, image data of files No.1 to No.6 has been recorded on the optical disk. But only management data for managing image data of files from No.1 to No.3 has been recorded on the optical disk. This means that a dismount process has not yet been performed for the optical disk. The management data corresponding to the image data of files No.4 and No.5 at the left side are renewed by a filing unit No.1 and the management data corresponding to the image data of files No.4 to No.6 at the right side are renewed by a filing unit No.2. However, the image data of the files No.4 and No.5 at the left side and those at the right side are not the same image data. Thus, if an image data having the same file number on the optical disk differs for every filing unit, a mismatch occurs between the image data and the management data. Accordingly, the following two rules are arranged in this embodiment to prevent the mismatch between image data and corresponding management data. First, there is only one allowed filing unit which is allowed to record new image data on an optical disk. And other filing units are referred to as "unallowed filing units". Thus, it may be said that the filing unit according to the present invention has two modes. Second, data representing the existence of the allowed filing unit, which will be referred to as a mount mark later, is recorded at a specific position on the optical disk.

The filing unit shown in FIG.1 differs from the conventional filing system in the backup processor 5, the data manager 6, the write-allowing flag 8a and the mount mark part 10a. As mentioned above, in the conventional system, when new image data is recorded on an optical disk, new management data corresponding to the new image data is reorded on a hard disk and the new management data is copied from the hard disk to the optical disk by the dismount process. However, according to the present invention, the new management data is recorded on the optical disk irrespective of the dismount process, only if the management data on the hard disk satisfies a predetermined condition, to save time required for the dismount process while the optical disk is being moved among the plurality of filing units. And, if the processing of the optical disk in another filing unit ends, the dismount process is performed therefor at last. Since the new management data is not recorded on the optical disk whenever the optical disk is ejected, it saves time and the average speed of writing image data becomes high.

The system controller 4 controls the operation of each part of this filing unit.

Figure 3:
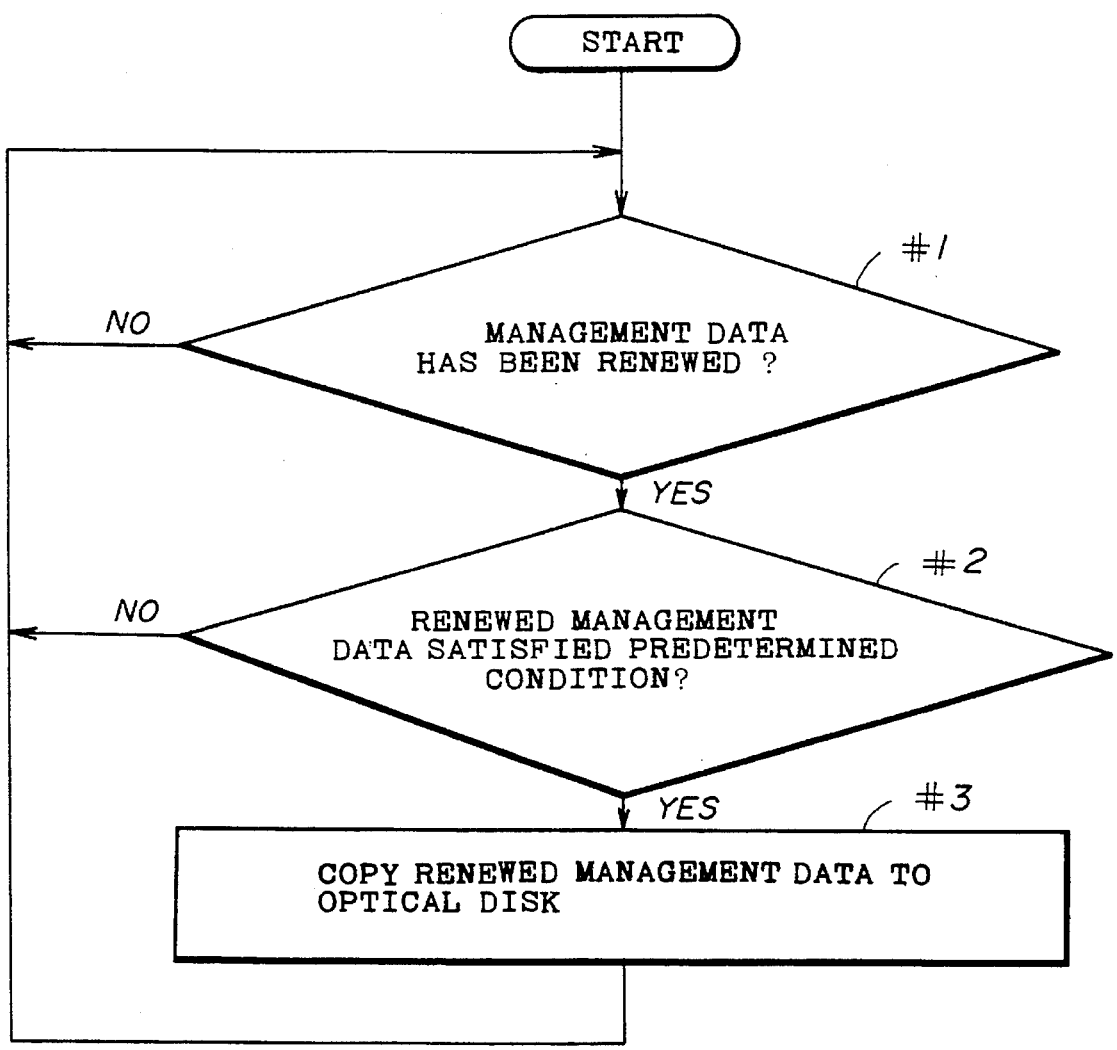
FIG.3 is a flowchart executed by the backup processor 5 shown in FIG.1.

The backup processor 5 automatically copies new management data on the hard disk 8 to the optical disk 10 in accordance with a flowchart shown in FIG.3. That is, the backup processor 5 first judges whether the management data on the hard disk 8 has been renewed (in step #1). If it is renewed, the backup processor 5 judges whether the renewed management data satisfies the predetermined condition (in step #2). If it satisfies the predetermined condition, the backup processor 5 copies the new management data to the optical disk 10 (in step #3). Incidentally, the backup processor 5 may have a threshold value representing the predetermined condition. Thus, in the step #3, the amount of the management data on the hard disk 8 is compared with the threshold value. If the threshold value is set relatively small, the average time for writing the image data becomes long but the amount of the image data which cannot be read out by another filing unit decreases. Conversely, if the threshold value is set relatively large, the average time for writing the image data becomes short but the amount of the image data which cannot be read out by another filing unit increases. A user of the filing unit can freely set the threshold value.

The data manager 6 comprises a mount processing part 61, dismount processing part 62, delete processing part 63 and lock release processing part 64. Only the mount process and dismount process are performed in the conventional filing system while the filing unit performs the mount process, the dismount process, a delete process and a lock process. In addition, the filing unit keeps management data even if the optical disk 10 is ejected from the optical disk storage 9, so that the same management data of an optical disk cannot simultaneously exist among a plurality of filing units. Thus, the present invention saves time required for the dismount process in the conventional filing system.

Figure 4:
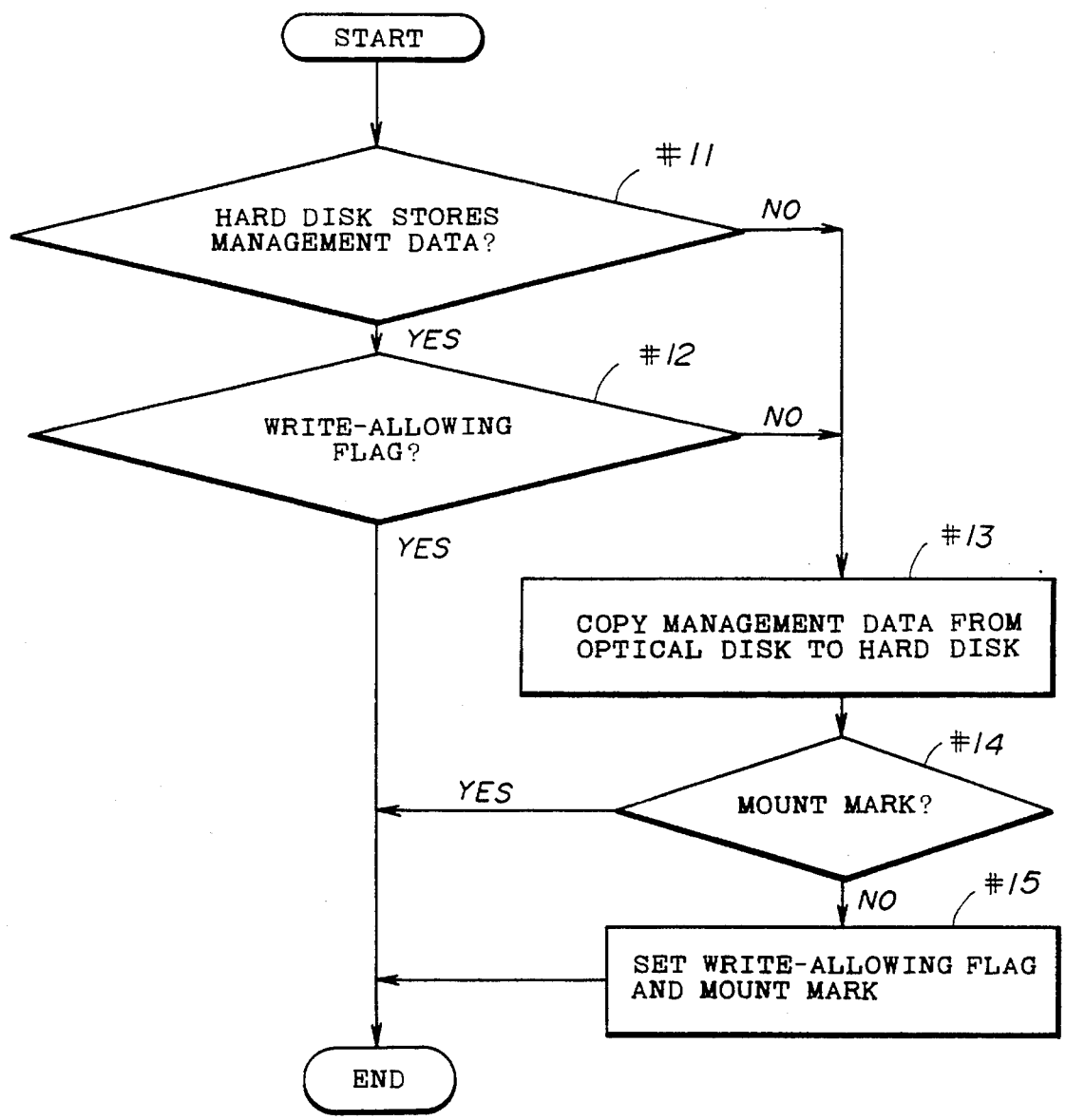
FIG.4 shows a flowchart executed by a mount processing part 61 in a data manager 6 shown in FIG.1.

A description will be given of the operation of the mount processing part 61 in the data manager 6 with reference FIG.4. It is premised that a hard disk in the conventional filing system stores no management data while the filing unit can cope with a case where the hard disk stores management data. Therefore, the mount processing part 61 first judges whether the hard disk 8 stores management data (in step #11). If the hard disk 8 stores the management data, then the mount processing part 61 judges whether a write-allowing flag is set in the hard disk 8 (in step #12). Hereupon, the hard disk 8 includes the write-allowing flag part 8a in which the write-allowing flag or the write-prohibiting flag is set, as shown in FIG.1. The write-allowing flag indicates that the filing unit is the allowed filing unit while the write-prohibiting flag indicates that the filing unit is the unallowed filing unit. However, if the mount processing part 61 judges NO in the step #11 or #12, then the mount processing part 61 copies the management data on the optical disk 10 to the hard disk 8 (in step #13). Then the mount processing part 61 judges whether or not the mount mark is present (in step #14), which mount mark will be described later. If there is not a mount mark, the mount processing part sets the write-allowing flag and the mount mark (in step #15).

The optical disk 10 includes a mount mark part 10a. A mount mark to be set in the mount mark part 10a indicates that there is the allowed filing unit. Therefore, if the optical disk 10 includes the mount mark, other unallowed filing units cannot record new image data thereon. Since only the allowed filing unit exists among the filing units, a filing unit can judge whether itself is the allowed filing unit or the unallowed filing unit by the mount mark. The mount mark is especially available for a filing unit having no flag in the write-allowing flag part 8a since it can become the allowed filing unit or the unallowed filing unit. If the optical disk does not include a mount mark, any filing unit to which the optical disk is inserted first of all the filing units becomes the allowed filing unit.

A description will now be given of the operation of the data management process according to the present invention in a case where an optical disk 8 is inserted into the optical disk storage 10 in an allowed filing unit. The optical disk 10 has been ejected from the optical disk storage 9 in the allowed filing unit and thus it includes, for example, two hundred image data, one hundred management data and the mount mark. On the other hand, the hard disk 7 in the allowed filing unit includes two hundred renewed management data and write-allowing flag. Since the allowed filing unit has not yet performed the dismount process for the optical disk 10, the management data of the optical disk 10 has not renewed yet. Even when the optical disk 10 is inserted into the optical disk storage 9 in the allowed filing unit, the allowed filing unit does not perform the mount process since it has already stored the management data of the optical disk storage therein. Then, if the allowed filing unit has performed the dismount process via the dismount processing part 62, the new management data on the hard disk 7 in the allowed filing unit is copied to the optical disk 10. As a result of the dismount process, the allowed filing unit becomes an unallowed filing unit, and the optical disk 10 includes two hundred image data, two hundred management data and no mount mark. Incidentally, the allowed filing unit may copy the new management data if the amount of the management data exceeds a threshold value via the backup processor 5.

Hereupon, a description will now be given of the operation of the dismount processing part 62 with reference to FIG. 5. The dismount processing part 62 of the allowed filing unit can perform the dismount process, needless to say. First, the dismount processing part 62 judges whether the filing unit is the allowed filing unit (in step #20). If the filing unit is the allowed filing unit, then the dismount processing part 62 judges whether the allowed filing unit stores new management data (in step #21). If it stores the new management data, the dismount processing part 62 copies the new management data from the hard disk to the optical disk (in step #22). Then the mount mark is deleted (in step #23) and the write-prohibiting flag is set (in step #24).

Incidentally, in the conventional system, after the dismount process is performed, the renewed data on the hard disk is deleted. However, the present invention provides the delete process performed by the delete processing part 63 in the data manager 6 instead of deleting the management data on the hard disk. The delete process can be performed in the unallowed filing unit since the management data stored in the allowed filing unit is usually only the data.

The optical disk 10 is locked in the optical disk storage 9 when the mount processing part 61 performs the mount process. However, the present invention provides the lock release process, by which the lock in the optical disk storage can be released, in order to eject the optical disk 10 from the optical disk storage 9 even if the dismount processing part 62 does not performed the dismount process for the optical disk 10.

Next, a description will now be given of the operation of the data management process according to the present invention in a case where an optical disk 8 is inserted into the optical disk storage 10 in an unallowed filing unit. The optical disk 10 has been ejected from an optical disk storage in an allowed filing unit and thus it includes, for example, two hundred image data, one hundred management data and the mount mark. On the other hand, the hard disk 7 in the unallowed filing unit includes, for example, eighty renewed management data and write-prohibiting flag. Incidentally, whether the unallowed filing unit includes the management data does not matter. But if the filing unit does not include any management data, the filing unit judges whether it is the allowed filing unit or the unallowed filing unit by the mount mark since the filing unit does not include any flag in the write-allowing flag part 8*a*. When the optical disk 10 is inserted into the optical disk storage 9 in the unallowed filing unit, the unallowed filing unit acknowledges the mount mark and copies the management data of the optical disk 10 to the hard disk 7 therein.

Thus, because of the backup processor 5 and the data manager 6, the amount of the mount process and the dismount process can be reduced.

Incidentally, the present invention can be applied to a case where a plurality of optical disks are used for one filing unit. Even in this case, the mount mark, the write-allowing flag and write-prohibiting flag are used.

Further, the present invention is not limited to these preferred embodiments, as various variations and modifications may be made without departing from the scope of the present invention.

What is claimed is:

1. A management method for managing image data on a first recording medium by using (1) management data on the first recording medium and (2) management data on a second recording medium, wherein each among a plurality of filing units has a respective second recording medium, wherein the first recording medium is connectable to, and disconnectable from, any one of the plurality of filing units, wherein an allowed filing unit, from among the plurality of filing units, is the only filing unit which is allowed to record new image data on the first recording medium, and wherein the first recording medium has a storage capacity larger than that of the second recording medium but has an access time longer than an access time of the second recording medium, the data management method comprising the steps of:

a) recording, on the first recording medium, management data including a mount mark, wherein the mount mark indicates that the first recording medium is connected to the only allowed filing unit among the plurality of filing units;

b) if management data has not been recorded onto any of the second recording media, copying the management data from the first recording medium to the second recording medium of the allowed filing unit;

c) recording new image data on the first recording medium while the first recording medium is connected to the allowed filing unit, using the management data recorded on the second recording medium of the allowed filing unit;

d) recording new management data on the second recording medium of the allowed filing unit, the new management data being related to the new image data recorded on the first recording medium, wherein the new management data includes a write-allowing flag which defines the filing unit, to which the first recording medium is connected, as the allowed filing unit; and e) when the new management data satisfies a predetermined condition, copying the new management data recorded on the second recording medium to the first recording medium while the first recording medium is attached to the allowed filing unit, wherein the first recording medium is capable of being disconnected from the allowed filing unit when the new management data does not satisfy the predetermined condition.

2. A data management method according to claim 1 further comprising the step of copying the management data recorded on the first recording medium to an arbitrary second recording medium of an arbitrary first filing unit among the plurality of second recording media when the first recording medium having the management data indicating the existence of the allowed filing unit is connected to the arbitrary filing unit or when the first recording medium is connected to the arbitrary filing unit in which the arbitrary second recording medium has the management data indicating that the arbitrary filing unit is not the allowed filing unit.

3. A data management method according to claim 1, wherein the predetermined condition comprises a threshold value set in each filing unit, and the predetermined condition is satisfied if the amount of the management data recorded on the second recording medium reaches the threshold value.

4. An apparatus for use with any of a plurality of filing units having respective second recording media, in which an allowed filing unit, from among the plurality of filing units, is the only filing unit which is allowed to record data onto a first recording medium, the apparatus comprising:

a) the first recording medium, the first recording medium having a storage capacity larger than that of any of the second recording media but having an access time longer than access times of the second recording media;

b) first recording/reproducing means, coupled to the first recording medium, for recording onto or reproducing from the first recording medium, main data and management data, wherein:
1) the first recording/reproducing means constitutes means for recording new main data onto the first recording medium only if the apparatus is in a first mode;
2) the management data includes a mount mark; and
3) the mount mark indicates that the first recording medium is connected to the only allowed filing unit among the plurality of filing units;

c) second recording/reproducing means, arranged to be coupled to a second recording medium from among the second recording media, for recording onto or reproducing from the second recording medium, the management data, if management data had not been recorded onto any of the second recording media;

d) data managing means including mount processing means for copying the management data from the first recording medium onto the second recording medium via the first and second recording/reproducing means; and e) backup processing means, coupled to the first and second recording/reproducing means, for copying new management data from the second recording medium onto the first recording medium via the second and first recording/reproducing means, when the new management data satisfies a predetermined condition; wherein:
1) the new management data is related to the new main data;
2) the new management data includes a write-allowing flag which defines the filing unit, to which the first recording medium is connected, as the allowed filing unit; and
3) the first recording medium is capable of being disconnected from the allowed filing unit when the new management data does not satisfy the predetermined condition.

5. A apparatus according to claim 4, wherein said data managing means further includes dismount processing means which copies new management data recorded on said second recording medium to the first recording medium via said first and second recording means without operating said backup processing means so that the new management data can be recorded on the first recording medium at any time.

6. A apparatus according to claim 4, wherein the mount processing means of said data managing means of said apparatus using an second mode copies the management data on the first recording medium to said second recording medium whenever the first recording medium is connected to said first recording/reproducing means.

7. A apparatus according to claim 4, wherein said first recording/reproducing means records, when the first recording medium whose management data has not recorded on another filing unit yet is connected thereto, the management data on the first recording medium indicating the existence of an allowed filing unit which is allowed to record the new main data on the first recording medium.

8. A apparatus according to claim 7, wherein said apparatus sets the first mode when the first recording medium having no management data indicating the existence of the allowed filing unit is connected to the first recording/reproducing means, and wherein the mount processing means of said data managing means copies the management data recorded on the first recording medium to said second recording medium.

9. A apparatus according to claim 4, wherein said backup processing means has a threshold value set in each filing unit, and the predetermined condition is satisfied if the amount of the management data recorded on said second recording medium reaches the threshold value.

10. A apparatus according to claim 4, wherein said data managing means further includes delete processing means for deleting the management data recorded on the second recording medium, if the first recording medium is connected to the first recording/reproducing means of said apparatus using an second mode, in order to copy the management data recorded on the first recording medium to said second recording medium.

11. A apparatus according to claim 4, wherein said data management means further includes lock release means, coupled to said backup processing means, for setting the first recording medium free from said first recording/reproducing means so that the first recording medium can be disconnected from said first recording/reproducing means if the new management data does not satisfy the predetermined condition.

12. A apparatus according to claim 4, wherein said apparatus sets an second mode therein when the first recording medium having the management data indicating the existence of the allowed filing unit which is allowed to record the new main data on the first recording medium is connected to said first recording/reproducing means of said filing unit which has set neither the first mode nor the second mode.

* * * * *